United States Patent
Watson et al.

(10) Patent No.: US 9,032,388 B1
(45) Date of Patent: May 12, 2015

(54) AUTHORIZING OR PREVENTING DEPLOYMENT OF UPDATE INFORMATION BASED ON DEPLOYMENT PARAMETERS

(75) Inventors: David Emory Watson, Seattle, WA (US); Mark Shamis, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 239 days.

(21) Appl. No.: 13/552,329

(22) Filed: Jul. 18, 2012

(51) Int. Cl.
*G06F 9/44* (2006.01)
*G06F 21/30* (2013.01)

(52) U.S. Cl.
CPC ..................... *G06F 21/30* (2013.01)

(58) Field of Classification Search
None
See application file for complete search history.

(56) References Cited

U.S. PATENT DOCUMENTS

| | | | |
|---|---|---|---|
| 6,601,234 B1* | 7/2003 | Bowman-Amuah | 717/108 |
| 6,920,111 B1* | 7/2005 | Zhang et al. | 370/235 |
| 7,069,541 B2* | 6/2006 | Dougherty et al. | 717/122 |
| 7,657,887 B2* | 2/2010 | Kothandaraman et al. | 717/176 |
| 8,127,274 B2* | 2/2012 | Astheimer | 717/120 |
| 2004/0187103 A1* | 9/2004 | Wickham et al. | 717/168 |
| 2011/0296252 A1* | 12/2011 | Maenpaa | 714/48 |
| 2012/0266156 A1* | 10/2012 | Spivak et al. | 717/172 |
| 2012/0266158 A1* | 10/2012 | Spivak et al. | 717/175 |
| 2012/0266168 A1* | 10/2012 | Spivak et al. | 718/1 |

* cited by examiner

*Primary Examiner* — Don Wong
*Assistant Examiner* — Roberto E Luna
(74) *Attorney, Agent, or Firm* — Sutherland Asbill & Brennan LLP

(57) ABSTRACT

One or more bookkeeping nodes may receive a request to deploy update information from a requesting node. The bookkeeping node(s) may determine whether to authorize the requesting node to deploy the update information based at least in part on one or more deployment parameters. If authorized, the requesting node may download the update information from one or more download nodes.

29 Claims, 8 Drawing Sheets

AUTHORIZING OR PREVENTING DEPLOYMENT OF UPDATE INFORMATION BASED ON DEPLOYMENT PARAMETERS

BACKGROUND

Software, firmware, or other types of program code are updated with code updates from time to time. A conventional process for handling code updates involves pushing the code updates out from a central server to each computing node to which the code update relates.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numerals indicates similar or identical items. However, different reference numerals may be used as well to indicate items which may be similar or identical. Various embodiments may utilize elements and/or components other than those illustrated in the drawings, and some elements and/or components may not be present in various embodiments. Depending on the context, singular and plural terminology may be used interchangeably.

DETAILED DESCRIPTION

Overview

Figure 1:
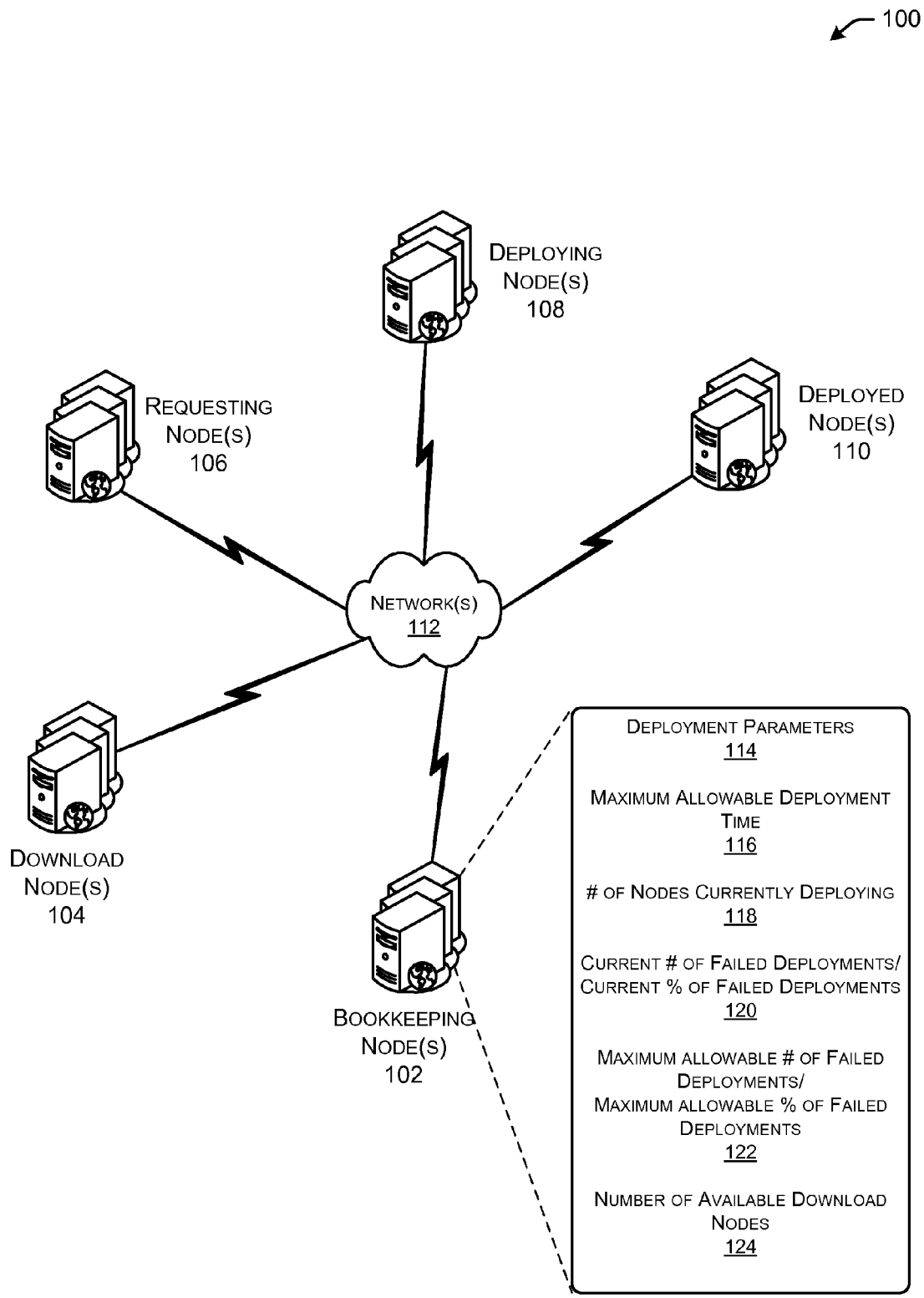
FIG. 1 depicts a high-level system architecture for facilitating deployment of update information by one or more nodes in a deployment group in accordance with an embodiment of the disclosure.

Code changes such as software, firmware, or other types of code updates are typically handled by a central server. For example, a developer may create a software or firmware update and send the update along with a code change management request to the central server. The central server may then push the software or firmware update out to each node to which the update relates. As used herein, a node may include a computing device, a networking device, and so forth. A computing device may include a smartphone or other cellular device, a tablet device, an electronic reader device, a laptop computer, a desktop computer, a workstation, a mainframe computer, a gaming console, a multimedia streaming device, or any other device that runs any type of program code that may be updated from time to time.

This conventional way of "pushing" code updates out to nodes from a central server has several disadvantages. One disadvantage is that the code updates occur only as fast as they can be pushed out to the various nodes. Also, in large computing environments, it is often too time-consuming to manually apply code updates. As a result, updates are tested, the update procedures are scripted, and the update scripts are executed on more than one node simultaneously. The code updates are first tested to increase the likelihood that the updates will be deployed successfully. However, there is always a possibility that the update will fail.

Because the update procedure is scripted, a node executing the update script will typically become inoperable before the update can be halted. For example, in the case of firmware updates, the firmware cannot be updated while the machine is operable. In the specific example of hard drive firmware updates, a machine must be booted into a special image (where the hard drive is not in use) in order to update the firmware. Further, in some cases, the update may not be capable of being interrupted at all.

Yet another characteristic of conventional deployment mechanisms is that there is typically no way to predict when a code update will occur. As previously mentioned, a node typically needs to be rebooted in order to apply a code update. There is generally no way to predict or control when a node will be rebooted. A node may be rebooted as a result of a planned maintenance activity, due to an execution failure, or for various other reasons.

The systems, methods, apparatuses, and techniques disclosed herein allow for code deployments to be handled even when it is not known when the deployment may occur for any particular node. In particular, a deployment environment may be provided that includes one or more bookkeeping nodes that store data relating to various deployment parameter(s). The bookkeeping node(s) may rely on the deployment parameter data to dynamically determine whether to allow a node to proceed with deployment of a code update. As used herein, the term deployment may refer to download and/or installation of a code update by a node to which the code update is applicable. Further, as used herein, the term update information or code update may include any one or more code updates of any kind.

The deployment parameter(s) may include a parameter indicative of a maximum allowable deployment time. The maximum allowable deployment time may specify a maximum time within which a node should complete download and installation of a code update (e.g., complete deployment of a code update). The deployment parameter(s) may further include a parameter indicative of a number of nodes currently deploying (e.g., nodes currently downloading and/or installing code updates). The deployment parameter(s) may further include a number of available download nodes from which code update(s) may be downloaded.

In addition, the deployment parameter(s) may also include a parameter indicative of a maximum allowable number or maximum allowable percentage of failed deployments and/or a parameter indicative of a current number or a current percentage of failed deployments. The parameters indicative of the current percentage of failed deployments or the maximum allowable percentage of failed deployments may be represented in any suitable way. For example, the parameter indicative of the current percentage of failed deployments may indicate a percentage of failed deployments in relation to a total number of deployments, failed and successful, or may indicate a ratio of a number of attempted deployments that have failed to a number of attempted deployments that have been successful. Any other suitable representation is possible.

In certain embodiments, the number of active deployments may be taken into account in determining the maximum allowable number or maximum allowable percentage of failed deployments. For example, one or more active deployments may be treated as potential failed deployments until the nodes successfully complete deployment. As such, in certain embodiments, the number of active deployments at any given time may not be permitted to exceed the difference between the maximum allowable number of failed deployments and the current number of failed deployments. The number of active deployments may be throttled to ensure that even if all active deployments were to fail, the maximum allowable number or maximum allowable percentage of failed deployments would not be exceeded.

A bookkeeping node may receive a request for a code update from a requesting node. The requesting node may transmit the request for a code update to the bookkeeping node upon rebooting of the node during a planned maintenance activity or for any other reason. The requesting node may be part of a deployment group. A deployment group may be defined according to any criteria. For example, in the case of firmware updates, a node's membership in a deployment group may be determined based on its hardware signature. A hardware signature may include identifying information for one or more hardware components forming part of a node such as a type of component, the manufacturer of the component, the model number associated with the component, and so forth. Each node that shares a common hardware signature may form part of a same deployment group. It should be understood that the above example is merely illustrative and that a deployment group may be defined according to any suitable criteria. For example, various nodes may be partitioned into virtual deployment groups according to one or more shared characteristics associated with software running on the nodes.

Upon receiving the request for a code update from the requesting node, the bookkeeping node may determine whether to permit the requesting node to deploy the code update or whether to prevent the requesting node from deploying the code update for at least some period of time. As at least part of this determination, the bookkeeping node may identify a number of actively deploying nodes. As previously noted, an actively deploying node may refer to a node that is currently downloading and/or installing the code update. For example, as part of the deployment parameter data, the bookkeeping node may maintain a counter that indicates the number of actively deploying nodes. The bookkeeping node may determine, based at least in part on the number of active deployments, whether the requesting node will be able to deploy the code update within the maximum allowable deployment time. In certain embodiments, a maximum allowable deployment time may be associated with each of a plurality of events corresponding to deployment of a code update. In such embodiments, the bookkeeping node may determine whether the requesting node will be able to complete each event within the corresponding maximum allowable deployment time.

In certain embodiments, the bookkeeping node may assess other deployment parameters as well in determining whether to permit the requesting node to deploy the code update. For example, the bookkeeping node may identify a total number of available download nodes or a number of available download nodes in relation to a total number of nodes in the deployment group, and may base its decision as to whether to permit the requesting node to deploy the code update at least in part on these deployment parameters relating to the download nodes. For example, depending on the number of download nodes and the number of nodes that are actively deploying, bandwidth limitations may necessitate, at least temporarily, the throttling back of the number of additional deployments that are permitted to occur.

In certain other embodiments, the bookkeeping node may base its decision as to whether to permit the requesting node to deploy the code update at least in part on various other deployment parameters as well. As previously noted, the deployment parameters may further include a parameter indicative of a maximum allowable number of failed deployments and/or a parameter indicative of a maximum allowable percentage of failed deployments. The deployment parameters may additionally include a parameter indicative of a current number of failed deployments and/or a parameter indicative of a current percentage of failed deployments.

Upon receiving the request for a code update from the requesting node, the bookkeeping node may determine whether allowing the requesting node to deploy would potentially cause the maximum allowable number or maximum allowable percentage of failed deployments to be exceeded. In making such a determination, the bookkeeping node may treat all active deployments as potential failed deployments and may further treat the potential deployment by the requesting node as a potential failed deployment as well. If the bookkeeping node determines that allowing the requesting node to deploy the code update may result in the maximum allowable number or maximum allowable percentage of failed deployments to be exceeded, the bookkeeping node may restrict or prevent the requesting node from deploying the code update.

In various embodiments, the bookkeeping node may dynamically adjust its determination as to whether to permit a requesting node to deploy a code update based on data relating to nodes that have successfully deployed the code update. For example, the bookkeeping node may, in various scenarios, be configured to permit a requesting node to deploy a code update even though the potential failure of the requesting node's deployment combined with previous failed deployments and/or the potential failure of actively deploying nodes may cause the maximum allowable number or maximum percentage of failed deployments to be exceeded. In other words, the bookkeeping node may be configured to increase its risk tolerance based at least in part on the number or percentage of previously successful deployments (or the number or percentage of previously failed deployments).

For example, the downloading node may initially permit X number of nodes to deploy the code update concomitantly. If a desired or better than desired success rate is observed for the X deployments (e.g., a desired or better than desired number or percentage of the X nodes successfully completed their respective deployments), the downloading node may determine that the number of nodes permitted to deploy the code update may be increased, and thus may be willing to assume the risk of a potential number or percentage of failed deployments that may exceed the maximum allowable number or maximum allowable percentage of failed deployments.

Conversely, if increasing the number of nodes that are permitted to deploy the code update at the same time results in a number of failed deployments or a percentage of failed deployments that exceeds the maximum allowable number or maximum allowable percentage of failed deployments, the bookkeeping node may either halt the deployment process or may once again lower the number of permitted active deployments on the assumption that a greater number or percentage of the deployments may fail.

Thus, in accordance with various embodiments of the disclosure, the bookkeeping node may dynamically adjust the deployment rate (e.g., the number of nodes permitted to deploy at the same time) such that the deployment rate falls within a dynamically determined confidence interval from a deployment rate that would otherwise be dictated by the maximum allowable number or maximum allowable percentage of failed deployments.

Purely by way of illustration, if the maximum allowable number of failed deployments is 10 for a given set of deployments, and only 1 of an initial 10 deployments fails, the bookkeeping node may adjust the confidence interval to assume a greater risk of failed deployments because the number of failed deployments for the initial 10 deployments was well within the maximum allowable number. As such, the bookkeeping node may subsequently permit, for example, 100 nodes to deploy the code update simultaneously. If the bookkeeping node observes greater than 10 failed deployments among the 100 active deployments, the bookkeeping node may again adjust the confidence interval to assume less risk and may lower the number of active deployments that are permitted. If, on the other hand, the bookkeeping node continues to observe less than the maximum allowable number of failed deployments, the bookkeeping node may continue to accept an even greater risk of failed deployments, and may increase the number of active deployments that are permitted to occur at the same time accordingly.

If, based at least in part on an analysis of one or more of the deployment parameters discussed above, the bookkeeping node determines that the requesting node should be permitted to deploy the code update, the bookkeeping node may authorize deployment of the code update and may direct the requesting node to obtain the code update from one or more download nodes. The bookkeeping node may convey information to the requesting node that identifies one or more download nodes storing the code update and from which the requesting node is instructed to download the code update. In various embodiments, the requesting node may receive the code update from a single download node, or alternatively, may receive different portions of the code update from various download nodes.

If, on the other hand, the bookkeeping node determines, based at least in part on an analysis of one or more deployment parameters, that the requesting node should not be permitted to deploy the code update at the time of the request, the bookkeeping node may temporarily restrict the requesting node from deploying the code update. As part of the deployment denial, the bookkeeping node may provide the requesting node with various information relating to one or more of the deployment parameters. For example, the bookkeeping node may indicate, to the requesting node, the number of actively deploying nodes, the number of nodes waiting to be approved to deploy the code update (e.g., the number of other requesting nodes in queue to deploy), the number of available download nodes, the current number of failed deployments or the current percentage of failed deployments, the maximum allowable number or maximum allowable percentage of failed deployments, and so forth.

In various embodiments, along with this information, the bookkeeping node may also provide the requesting node with an estimated period of time to wait before again requesting approval to deploy the code update. This estimated period of time may be determined based at least in part on any of the deployment parameters and/or based on the number of nodes in queue to deploy. The requesting node may then wait for the estimated period of time before again requesting deployment of the code update. In one or more alternative embodiments, the requesting node may make its own independent determination as to the period of time to wait before again requesting deployment of the code update based at least in part on the information provided to it by the bookkeeping node.

Upon receiving an indication from the bookkeeping node that it is not permitted to deploy at the time of a first request, the requesting node may transmit, at a later point in time, a second request to the bookkeeping node to deploy the code update. The second request may be transmitted after the estimated waiting time has elapsed since the first request. The bookkeeping node may again make a determination upon receipt of the second request, based on various deployment parameters, as to whether to authorize the requesting node to initiate deployment of the code update.

Between the time of receipt of the first request for the code update from the requesting node and the time of receipt of the second request, any number of nodes may have completed deployment of the code update and/or begun deployment of the code update. Thus, the number of actively deploying nodes may have changed. The bookkeeping node may monitor the number of actively deploying nodes, and may increment the counter each time a new node begins deployment and decrement the counter each time a node completes deployment. Each node that completes deployment of the code update may notify the bookkeeping node upon completion so that the bookkeeping node may decrement the counter accordingly. Further, the deployment rate permitted by the bookkeeping node may have changed based on a number or percentage of deployments that have been successful between the times that the first request and second request are received. Thus, based at least in part on the potential modifications to the deployment parameters between the times that the two requests are received, the bookkeeping node may authorize the requesting node to deploy, or may once again prevent the requesting node from deploying until a later time.

The deployment environment may take on different forms. For example, in one embodiment, a single node may provide both bookkeeping and download functionality. A single node may store the data relating to the deployment parameter(s) as well as the code update(s). A requesting node may request a code update from the bookkeeping and download node. The single bookkeeping and download node may determine, based on the data relating to the deployment parameter(s), whether to authorize the requesting node to begin deployment of the code update, and may authorize the requesting node to deploy the code update or may prevent (at least temporarily) the requesting node from deploying the code update based on that determination. In the single bookkeeping and download node embodiment, the requesting node, when authorized to do so, may download the code update from the single bookkeeping and download node.

In another embodiment, a web service comprising multiple nodes where each node provides bookkeeping functionality and/or a download functionality may be provided. For example, each of the nodes may provide both the bookkeeping and download functionalities or only a portion of the multiple nodes may provide both functionalities. Any combination is within the scope of this disclosure. A requesting node may send a request to deploy a code update to any one of the nodes providing the bookkeeping functionality. The bookkeeping node receiving the request (which may also provide download functionality) may determine, in a manner similar to that described previously, whether to authorize the requesting node to download the code update. If authorized, the bookkeeping node may direct the requesting node to download the code update from one or more of the download nodes. The requesting node may download different data packets corresponding to different segments of the code update from different download nodes (including potentially the bookkeeping node that received the request) and assemble and install the code update.

In yet another embodiment, a peer-to-peer deployment environment may be provided. The peer-to-peer deployment environment may be an overlay network where the nodes are connected by virtual or logical links. As used herein, an overlay network refers to a computer network defined in relation to an underlying network. Each virtual or logical link in the overlay network corresponds to a path between the connected nodes, perhaps through several physical links in the underlying network.

In the peer-to-peer environment, multiple nodes may each provide bookkeeping and download functionalities. Each node may store one or more code updates, where each code update is associated with one or more nodes. Each node may be able to determine a number of nodes that are actively deploying a code update that it seeks to deploy using, for example, an aggregation algorithm. The aggregation algorithm may be any algorithm, such as a Chord protocol or any other algorithm, for facilitating a distributed count of the number of deploying nodes. For example, each node may be assigned one or more keys, and each node may store one or more key-value pairs. Based on the key-value pairs stored by each node, a distributed count of the number of actively deploying nodes may be made. Each node may be further configured to determine any of the deployment parameters previously described.

If a node determines, based on the application of the aggregation algorithm and a determination of the number of actively deploying nodes and/or on any other deployment parameters, that it is permitted to deploy the code update, the node may then download one or more portions of the code update from one or more peer nodes.

In yet another embodiment, the download functionality may be implemented using a group of download nodes (e.g., a web service) or a peer-to-peer architecture, while the bookkeeping functionality may be implemented using a single bookkeeping node or a group of bookkeeping nodes. As actively deploying nodes complete deployment of code updates, they may join the web service or the peer-to-peer download environment and may serve as download nodes to other deploying nodes. Further, in a peer-to-peer download architecture, a download node may obtain future code updates in a peer-to-peer fashion from other peer download nodes. Because downloading is an input/output intensive process, a web service or a peer-to-peer architecture for the download environment may ensure that suitable bandwidth is available for achieving a desired rate of deployment.

While specific architectural configurations have been described, it should be appreciated that numerous other configurations are within the scope of this disclosure. In various embodiments of the disclosure, a system architecture may be tailored to the functionality that is provided. For example, each of the downloading functionality, the bookkeeping functionality, and/or the deploying functionality may be implemented using an architectural configuration that is tailored to that functionality. Because downloading is bandwidth intensive, downloading functionality may be more efficiently implemented using a group of download nodes or a peer-to-peer download environment. However, bookkeeping functionality may not be as bandwidth intensive as downloading functionality, and as such, a web service or a peer-to-peer architecture may not be necessary to provide bookkeeping functionality efficiently.

The peer-to-peer deployment environment provides more scalability than the web service environment, which, in turn, provides more scalability than the single bookkeeping and download node embodiment. Where there is a single node providing both the bookkeeping and download services, the single node may quickly become a bottleneck as the number of deploying nodes increases. The web service environment may provide greater scalability than the single bookkeeping and download node. However, the web service environment, which includes multiple nodes with each node providing bookkeeping and/or download services, may suffer from processing and network bandwidth issues. The peer-to-peer deployment environment provides the greatest degree of scalability because it is capable of scaling with the number of nodes. Each new node added to the peer-to-peer deployment environment provides greater processing capabilities and more network links, which in turn increases available network bandwidth.

Illustrative Architecture

FIG. 1 depicts a high-level system architecture 100 of a deployment environment for managing the deployment of code updates. The architecture 100 may include one or more bookkeeping nodes 102 that provide a bookkeeping service/functionality, one or more download node(s) 104 from which code updates may be downloaded, one or more requesting node(s) 106 that, within the snapshot depicted in FIG. 1, may be requesting to deploy associated code update(s), one or more deploying node(s) 108 that may be actively deploying code update(s), and one or more deployed node(s) 110 that may have completed deployment of code update(s). The architecture 100 may further include one or more nodes that have attempted deployment of code update(s) and have failed. For example, one or more of the requesting node(s) 106, one or more of the deploying node(s) 108, and/or one or more of the deployed node(s) 110 may have previously attempted deployments that have failed.

Each of the nodes forming part of the architecture 100 may be configured to communicate via one or more network(s) 112. The network(s) 112 may include, but are not limited to, any one or a combination of different types of suitable communications networks, such as cable networks, the Internet, wireless networks, cellular networks, and other private and/or public networks. Further, the network(s) 112 may include any type of medium over which network traffic may be carried including, but not limited to, coaxial cable, twisted wire pair, optical fiber, hybrid fiber coaxial (HFC), microwave terrestrial transceivers, radio frequency communications, satellite communications, or combinations thereof.

The one or more bookkeeping nodes 102 may store data relating to one or more deployment parameters 114. The deployment parameter(s) 114 may include a parameter 116 indicative of a maximum allowable deployment time. The maximum allowable deployment time parameter 116 may specify a maximum time within which a node is required to complete deployment of a code update. The deployment parameter(s) 114 may also include a parameter 118 indicative of a number of nodes currently deploying (a number of actively deploying nodes). In various embodiments, the bookkeeping node 102 may store a counter whose value indicates a number of actively deploying nodes. When a node completes deployment of the update information (e.g., deployed node(s) 110), it may inform the bookkeeping node 102, and the bookkeeping node 102 may decrement the counter accordingly. Further, when a node is authorized to deploy the update information (e.g. deploying node(s) 108), the bookkeeping node 102 may increment the counter accordingly. In some embodiments, the maximum allowable deployment time parameter 116 may be based at least in part on a number of nodes actively deploying 118 and/or a number of available download nodes 124, each of which may be additional parameters included in the deployment parameter(s) 114.

The deployment parameter(s) 114 may further include one or more parameters 120 indicative of a current number or a current percentage of failed deployments and one or more parameters 122 indicative of a maximum allowable number of failed deployments or a maximum allowable percentage of failed deployments. For example, the parameter 120 may represent a current percentage of failed deployments in relation to a total number of deployments, failed and successful. Alternatively, the parameter 120 may indicate a ratio of a number of attempted deployments that have failed to a number of attempted deployments that have been successful. It will be understood by one of ordinary skill in the art that the parameter 120 may be represented in any suitable way for assessing a degree to which attempted deployments of the code updates have failed.

The architecture 100 depicted in FIG. 1 may be embodied in any form including the single bookkeeping and download node environment, the web service environment, the peer-to-peer deployment environment, or any combination thereof. Each of these deployment environments will be described in more detail through reference to FIGS. 2-5.

Figure 2:
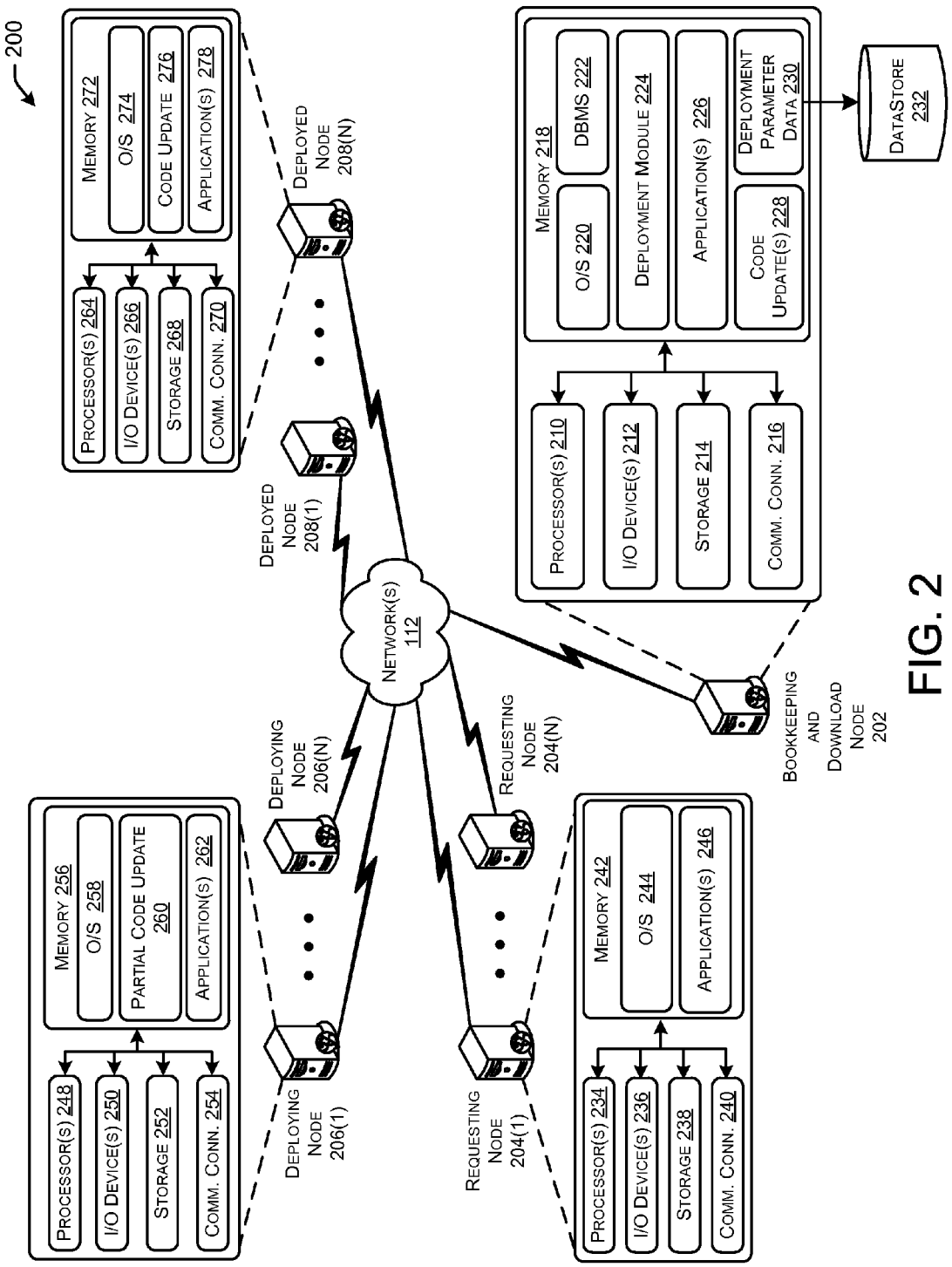
FIG. 2 depicts a system architecture including a single bookkeeping/download node in accordance with an embodiment of the disclosure.

FIG. 2 depicts an illustrative system architecture 200 for facilitating deployment of update information with a single node that provides both bookkeeping and download functionality. The system architecture 200 includes a single bookkeeping and download node 202, one or more requesting nodes 204(1)-204(N) requesting deployment of one or more code updates, one or more deploying nodes 206(1)-206(N) that are actively deploying one or more code updates, and one or more deployed nodes 208(1)-208(N) that have successfully completed deployment of code update(s). The architecture 200 may further include one or more nodes that have previously attempted deployments that have failed, which may be any one or more of the requesting node(s) 204(1)-204(N), the deploying node(s) 206(1)-206(N), or the deployed node(s) 208(1)-208(N). In certain embodiments, each of the nodes forming part of the architecture 200 may be capable of communicating with any other node or a subset of node(s) via one or more networks 112 such as those previously described through reference to FIG. 1. For example, in the single bookkeeping and download node embodiment of FIG. 2, each of the requesting nodes 204(1)-204(N), each of the deploying nodes 206(1)-206(N), and each of the deployed nodes 208(1)-208(N) may be configured to only communicate via the network(s) 112 with the bookkeeping and download node 202.

The bookkeeping and download node 202, each of the requesting node(s) 204(1)-204(N), each of the deploying node(s) 206(1)-206(N), and each of the deployed nodes 208(1)-208(N) may include respectively at least one memory 218, 242, 256, 272 and respectively one or more processing units (or processor(s)) 210, 234, 248, 264. The processors 210, 234, 248, 264 may be implemented as appropriate in hardware, software, firmware, or combinations thereof. Software or firmware implementations of the processors 210, 234, 248, 264 may include computer-executable or machine-executable instructions written in any suitable programming language to perform the various functions described. Similarly, hardware implementations of the processors 210, 234, 248, 264 may be configured to execute computer-executable or machine-executable instructions to perform the various functions described.

Each of the at least one memories 218, 242, 256, 272 may store program instructions that are loadable and executable by the respective processors 210, 234, 248, 264, as well as data generated during the execution of the program instructions. Each of the at least one memories 218, 242, 256, 272 may be volatile (such as random access memory (RAM)) and/or non-volatile (such as read-only memory (ROM), flash memory, etc.). In some implementations, each of the at least one memories 218, 242, 256, 272 may include multiple different types of memory, such as static random access memory (SRAM), dynamic random access memory (DRAM), and/or ROM.

Each of the nodes 202, 204(1)-204(N), 206(1)-206(N), 208(1)-208(N) may also include respective additional storage 214, 238, 252, 268 which may include removable storage and/or non-removable storage. The additional storage 214, 238, 252, 268 may include, but is not limited to, magnetic storage, optical disks, and/or tape storage. The disk drives and their associated computer-readable media may provide non-volatile storage of computer-readable instructions, data structures, program modules, and other data for the computing devices.

The at least one memories 218, 242, 256, 272 and/or the additional storage 214, 238, 252, 268, removable and/or non-removable, are all examples of computer-readable storage media. For example, computer-readable storage media may include volatile and/or non-volatile, removable and/or non-removable media implemented according to any method or technology for storage of information such as computer-readable instructions, data structures, program modules, and/or other data.

Each of the nodes 202, 204(1)-204(N), 206(1)-206(N), 208(1)-208(N) may also include respective communications connection(s) 216, 240, 254, 270 that allow the respective nodes to communicate with datastores, other computing devices or servers, user terminals, and/or other devices via the network(s) 112. Further, each of the nodes 202, 204(1)-204(N), 206(1)-206(N), 208(1)-208(N) may also include respective input/output (I/O) device(s) 212, 236, 250, 266, such as a keyboard, a mouse, a pen, a voice input device, a touch input device, a display, speakers, a camera, a microphone, a printer, etc.

Each of the respective at least one memories 218, 242, 256, 272 of each of the nodes 202, 204(1)-204(N), 206(1)-206(N), 208(1)-208(N) may have a respective operating system (O/S) 220, 244, 258, 274 loaded therein. Further, each of the nodes 202, 204(1)-204(N), 206(1)-206(N), 208(1)-208(N) may have respective application(s) 226, 246, 262, 278 loaded into their respective at least one memories 218, 242, 256, 272. Further, the bookkeeping and download node 202 may have a database management system (DBMS) 222 stored in the at least one memory 218 for accessing, retrieving, and storing data in one or more datastores (e.g., datastore 232). While the requesting nodes 204(1)-204(N), the deploying nodes 206(1)-206(N), and the deployed nodes 208(1)-208(N) are not depicted as having database management systems loaded into their respective at least one memories, it will be appreciated by one of ordinary skill in the art that such systems may be provided.

The at least one memory 218 of the bookkeeping and download node 202 may include a deployment module 224. The deployment module 224 may include computer-executable instructions that when executed by the processor(s) 210 configure the processor(s) 210 to perform one or more operations for facilitating deployment of code update(s) to one or more other nodes in the environment.

The at least one memory 218 may store one or more code updates 228 associated with one or more nodes in the architecture 200. The code update(s) 228 may be software updates, firmware updates, or any other code updates. The at least one memory 218 may further store deployment parameter data 230. The deployment parameter data 230 may include data relating to various deployment parameters such as those discussed through reference to FIG. 1.

In one or more embodiments, the bookkeeping and download node 202 may receive a request to deploy a code update of the one or more code updates 228 from a requesting node of the one or more requesting nodes 204(1)-204(N). For simplicity of presentation, it will be assumed that the requesting node from which the request is received is requesting node 204(1).

Upon receiving the request for a code update 228 from the requesting node 204(1), computer-executable instructions provided as part of the deployment module 224 may be executed to determine whether to permit the requesting node 204(1) to deploy (e.g., download and install) the code update based at least in part on the deployment parameter data 230. For example, the deployment module 224 may determine a number of actively deploying nodes (e.g., 206(1)-206(N)). More specifically, computer-executable instructions of the deployment module 224 may be executed to determine a value of a stored counter indicating a number of actively deploying nodes currently deploying code updates. Based at least in part on the number of actively deploying nodes, the deployment module 224 may determine whether the requesting node 204(1) will complete deployment of the code update within a maximum allowable deployment time (which may be another deployment parameter stored as part of the deployment parameter data 230).

If it is determined that the requesting node will be able to complete the deployment of the code update 228 within the maximum allowable deployment time, the bookkeeping and download node 202 may authorize deployment of the code update 228 by the requesting node 204(1). More specifically, the bookkeeping and download node 202 may permit the requesting node 204(1) to download the code update 228 from the node 202. On the other hand, if it is determined that the deployment will not be completed within the maximum allowable deployment time, the requesting node 204(1) may be prevented from downloading the code update from the bookkeeping and download node 202 until a later time.

As previously noted, the deployment parameter data 230 may include data relating to other deployment parameter(s) such as a parameter indicative of a maximum allowable number or maximum allowable percentage of failed deployments and/or a parameter indicative of a current number or a current percentage of failed deployments of a code update. In addition to determining whether the requesting node 204(1) will be able to complete deployment of the code update within the maximum allowable deployment time, or as an alternative thereto, the deployment module 224 may further comprise computer-executable instructions for determining whether allowing the requesting node 204(1) to deploy will result in the maximum allowable number or maximum allowable percentage of failed deployments to be exceeded. If it is determined that permitting the node 204(1) to deploy will cause the maximum allowable number or maximum allowable percentage of failed deployments to be exceeded, the bookkeeping and download node 202 may prevent the requesting node 204(1) from deploying at that time. However, if the opposite determination is made, the requesting node 204(1) may be permitted to deploy the code update.

In certain embodiments, the bookkeeping and download node 202 may dynamically modify the rate of deployment based on a number of previously successful or failed deployments. For example, if the number of failed deployments among a set of nodes that have attempted deployment is less than the maximum allowable number of failed deployments or if the failure rate is less than the maximum allowable percentage of failed deployments, the bookkeeping and download node 202 may tolerate an increased risk of failure and may permit one or more of the requesting nodes 204(1)-204(N) to deploy the code update even though permitting deployment may cause the maximum allowable number of failed deployments or the maximum allowable percentage of failed deployments to be exceeded. Conversely, the bookkeeping and download node 202 may reduce the rate of deployment if the number of failed deployments among a set of nodes that have attempted deployment is greater than the maximum allowable number of failed deployments or if the failure rate is greater than the maximum allowable percentage of failed deployments. Whether the maximum allowable number or maximum allowable percentage of failed deployments has been exceeded, or potentially may be exceeded, may be determined with respect to any number of previous and/or active deployments.

If the requesting node 204(1) is prevented from deploying the code update, the bookkeeping and download node 202 may provide the requesting node 204(1) with various information relating to one or more of the deployment parameters. For example, the bookkeeping and download node 202 may indicate, to the requesting node 204(1), the number of actively deploying nodes, the number of nodes in queue to deploy the code update, the number of available download nodes, the current number of failed deployments or the current percentage of failed deployments, the maximum allowable number or maximum allowable percentage of failed deployments, and so forth.

In various embodiments, along with this information, the bookkeeping and download node 202 may also provide the requesting node 204(1) with an estimated period of time to wait before again requesting approval to deploy the code update. This estimated period of time may be determined based at least in part on any of the deployment parameters and/or based on the number of nodes waiting in queue to deploy. The requesting node 204(1) may then wait for the estimated period of time before again requesting deployment of the code update. In one or more alternative embodiments, the requesting node 204(1) may make its own independent determination as to the period of time to wait before again requesting deployment of the code update based at least in part on the information provided to it by the bookkeeping and download node 202.

In FIG. 2, the requesting node(s) 204(1)-204(N) are not depicted as including any code updates stored in the memory 242 because these nodes, as of the snapshot in time depicted in FIG. 2, have not been authorized as of yet to download and install the code update(s). Because the deploying node(s) 206(1)-206(N) are currently downloading code update(s), a partial code update 260 is shown as being stored in the memory 256. The deployed nodes 208(1)-208(N) have successfully completed deployment of the code update(s) 276 stored in the memory 272.

In various embodiments, the requesting node 204(1) may submit a second request for a code update after the first request is denied. In various embodiments, the requesting node 204(1) may wait the estimated period of time before again requesting to deploy the code update. Between the time of receipt of the first request for the code update and the time of receipt of the second request, any number of nodes may have completed deployment of the code update and/or begun deployment of the code update. Thus, the number of actively deploying nodes may have changed. The bookkeeping and download node 202 may keep track of the number of actively deploying nodes, and may increment the counter stored in the deployment parameter data 230 each time a new node begins deploying the code update and decrement the counter each time a node completes deployment. Each node (e.g., any of deployed nodes 208(1)-208(N)) that completes deployment of the code update may notify the bookkeeping and download node 202 upon completion so that the node 202 may decrement the counter accordingly. Further, based on the number of failed and/or successful deployments since the first request was received, the current number or current percentage of failed deployments may have changed.

Upon receipt of the second request, the deployment module 224 of the bookkeeping and download node 202 may again determine whether to permit the requesting node 204(1) to deploy the code update based at least in part on the current deployment parameter data 230. Depending on how the deployment parameter data 230 has changed since the first request, the bookkeeping and download node 202 may either authorize the requesting node 204(1) to deploy the code update, or may deny the second request. If the second request is denied, the requesting node 204(1) may subsequently request deployment of the code update any number of times.

Figure 3:
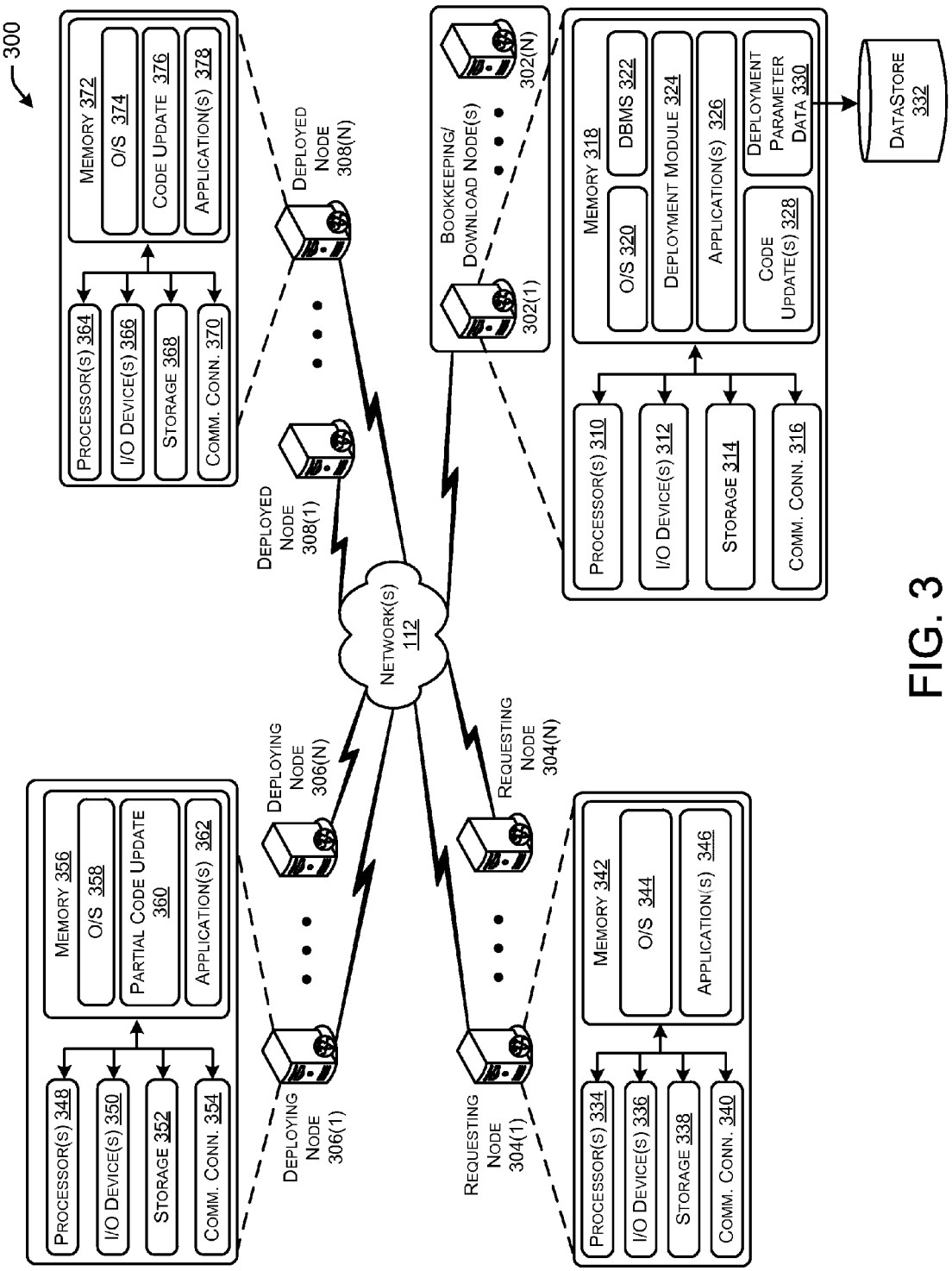
FIG. 3 depicts a system architecture for facilitating deployment of update information using a group of bookkeeping/download nodes in accordance with an embodiment of the disclosure.

FIG. 3 depicts an illustrative system architecture 300 for facilitating deployment of update information using a group of bookkeeping/download nodes (e.g., a web service). The system architecture 300 includes a group of bookkeeping/download nodes 302(1)-302(N), one or more requesting nodes 304(1)-304(N) requesting to deploy one or more code updates, one or more deploying nodes 306(1)-306(N) currently deploying one or more code updates, and one or more deployed nodes 308(1)-308(N) that have successfully completed deployment of code update(s). The architecture 300 may further include one or more nodes that have previously attempted deployments that have failed, which may be any of the requesting node(s) 304(1)-304(N), any of the deploying node(s) 306(1)-306(N), or any of the deployed node(s) 308(1)-308(N). In certain embodiments, each of the nodes forming part of the architecture 300 may be capable of communicating with at least one other node via one or more networks 112 such as those previously described through reference to FIG. 1. In certain aspects of the embodiment depicted in FIG. 3, each of the requesting nodes 304(1)-304(N), each of the deploying nodes 306(1)-306(N), and each of the deployed nodes 308(1)-308(N) may be configured to only communicate via the network(s) 112 with the group of bookkeeping/download nodes 302(1)-302(N).

Each of the bookkeeping/download nodes 302(1)-302(N) may be capable of providing the bookkeeping functionality and/or the download functionality. In certain embodiments, all of the bookkeeping/download nodes 302(1)-302(N) may be configured to provide both services. In other embodiments, certain of the bookkeeping/download nodes 302(1)-302(N) may only provide bookkeeping functionality while certain other of the bookkeeping/download nodes 302(1)-302(N) may only provide download functionality.

Each of the bookkeeping/download nodes 302(1)-302(N), each of the requesting node(s) 304(1)-304(N), each of the deploying node(s) 306(1)-306(N), and each of the deployed nodes 308(1)-308(N) may include respectively at least one memory 318, 342, 356, 372 and respectively one or more processing units (or processor(s)) 310, 334, 348, 364. The processors 310, 334, 348, 364 may correspond to any of the types of processors 210, 234, 248, 264 described through reference to FIG. 2. Further, each of the at least one memories 318, 342, 356, 372 may correspond to any of the types of at least one memories 218, 242, 256, 272 described through reference to FIG. 2.

In addition, each of the nodes 302(1)-302(N), 304(1)-304(N), 306(1)-306(N), 308(1)-308(N) may also include respective additional storage 314, 338, 352, 368 which may correspond to any of the types of additional storage 214, 238, 252, 268 described through reference to FIG. 2. The at least one memories 318, 342, 356, 372 and/or the additional storage 314, 338, 352, 368, removable and/or non-removable, are all examples of computer-readable storage media. For example, computer-readable storage media may include volatile and/or non-volatile, removable and/or non-removable media implemented according to any method or technology for storage of information such as computer-readable instructions, data structures, program modules, and/or other data.

Each of the nodes 302(1)-302(N), 304(1)-304(N), 306(1)-306(N), 308(1)-308(N) may also include respective communications connection(s) 316, 340, 354, 370 that may correspond to any of the types of communications connection(s) 216, 240, 254, 270 described through reference to FIG. 2. Further, each of the nodes 302(1)-302(N), 304(1)-304(N), 306(1)-306(N), 308(1)-308(N) may also include respective input/output (I/O) device(s) 312, 336, 350, 366, such as a keyboard, a mouse, a pen, a voice input device, a touch input device, a display, speakers, a camera, a microphone, a printer, etc.

Each of the respective at least one memories 318, 342, 356, 372 of each of the nodes 302(1)-302(N), 304(1)-304(N), 306(1)-306(N), 308(1)-308(N) may have a respective operating system (O/S) 320, 344, 358, 374 loaded therein. Further, each of the nodes 302(1)-302(N), 304(1)-304(N), 306(1)-306(N), 308(1)-308(N) may have respective application(s) 326, 346, 362, 378 loaded into their respective at least one memories 318, 342, 356, 372. Further, each of the bookkeeping/download nodes 302(1)-302(N) may have a database management system (DBMS) 322 stored in the at least one memory 318 for accessing, retrieving, and storing data in one or more datastores (e.g., datastore 332). While the requesting nodes 304(1)-304(N), the deploying nodes 306(1)-306(N), and the deployed nodes 308(1)-308(N) are not depicted as having database management systems loaded into their respective at least one memories, it will be appreciated by one of ordinary skill in the art that such systems may be provided.

The at least one memory 318 of those bookkeeping/download nodes 302(1)-302(N) capable of providing bookkeeping functionality may include a deployment module 324. The deployment module 324 may include computer-executable instructions that when executed by the processor(s) 310 configure the processor(s) 310 to perform one or more operations for facilitating deployment of code update(s) to another node in the environment.

The at least one memory 318 of those bookkeeping/download nodes 302(1)-302(N) capable of providing download functionality may store one or more code updates 328 associated with one or more nodes in the architecture 300. The code update(s) 328 may be software updates, firmware updates, or any other code updates. The at least one memory 318 of those bookkeeping/download nodes 302(1)-302(N) capable of providing bookkeeping functionality may further store deployment parameter data 330. The deployment parameter data 330 may include data relating to various deployment parameters which may correspond to any of the deployment parameters described through reference to FIG. 2.

In one or more embodiments, any of the bookkeeping/download nodes 302(1)-302(N) capable of providing bookkeeping functionality may receive a request for a code update of the one or more code updates 328 from a requesting node of the one or more requesting nodes 304(1)-304(N). For simplicity of presentation, it will be assumed that the requesting node from which the request is received is requesting node 304(1).

Upon receiving the request for a code update 328 from the requesting node 304(1), computer-executable instructions provided as part of the deployment module 324 of the bookkeeping/download node 302 that receives the request may be executed to determine whether to allow the requesting node 304(1) to download the code update based on the deployment parameter data 330. Similar determinations, such as those discussed through reference to FIG. 2, may be made by the deployment module 324.

If it is determined that the requesting node 304(1) is authorized to receive the code update 328, the bookkeeping/download node 302 that received the request may direct the requesting node 304(1) to obtain the code update 328 from one or more of the bookkeeping/download nodes 302(1)-302(N) capable of providing the download functionality. In various embodiments, the requesting node 304(1) may receive different portions of the code update 328 from different download nodes of the bookkeeping/download nodes 302(1)-302(N). In this manner, the web service architecture 300 provides greater scalability than the single bookkeeping and download node architecture 200, and also minimizes the bottleneck issues that may arise in the single node architecture 200 by providing multiple download nodes from which the code update may be obtained and deployed. It should be noted that the deploying node(s) 306(1)-306(N) are shown as having a partial code update 360 stored in the at least one memory 356 because the deployment node(s) 306(1)-306(N) are currently deploying code update(s) (e.g., code update(s) 328), and thus may not yet have completed download and/or installation of the code update(s). In addition, the deployed node(s) 308(1)-308(N) are shown as having the code update 376 stored in the at least one memory 372 because the deployed node(s) 308(1)-308(N) have completed deployment of the code update 376 (which may correspond to one or more of the code update(s) 328).

Figure 4:
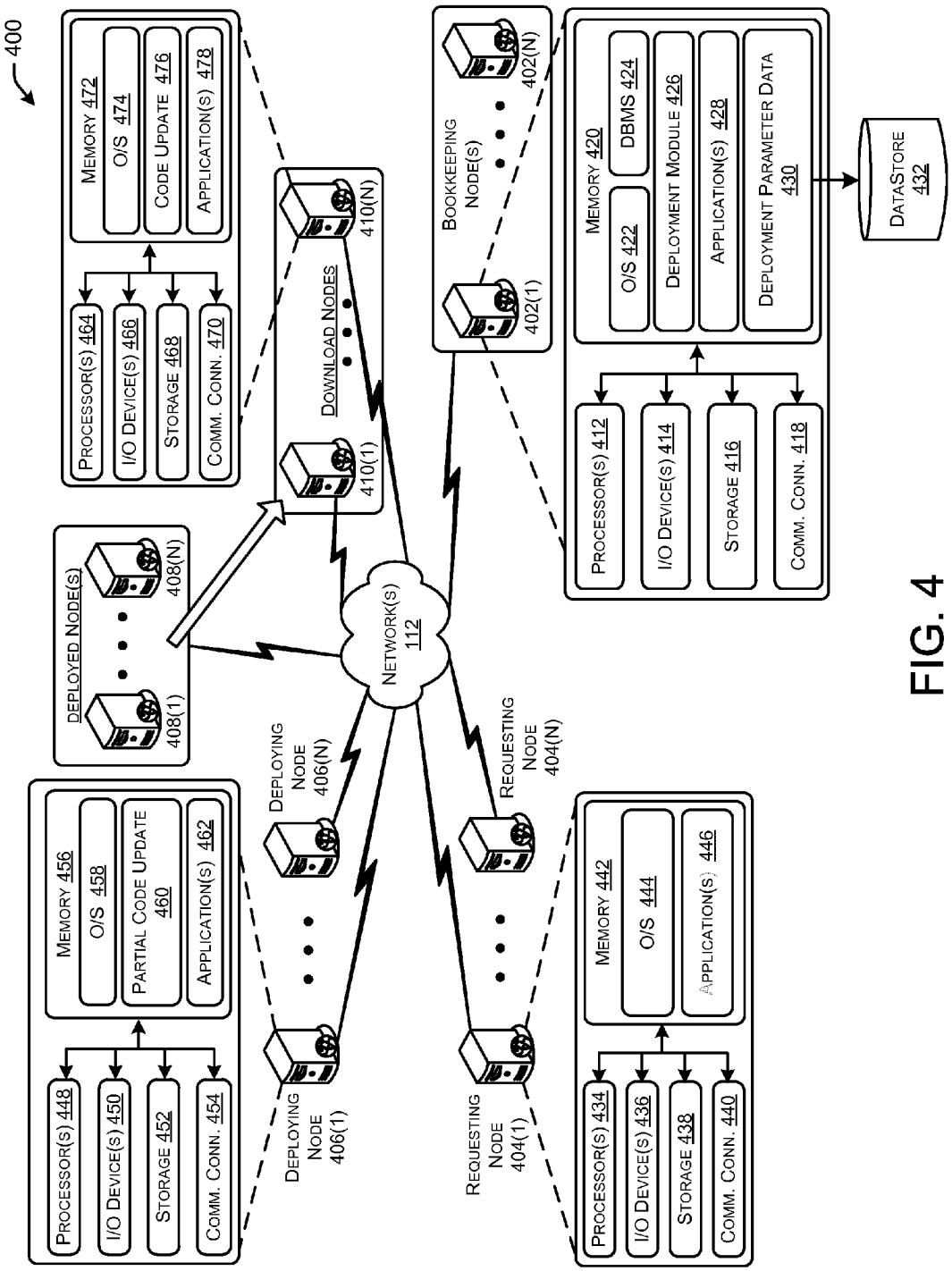
FIG. 4 depicts a system architecture for facilitating deployment of update information in which deployed nodes become part of a peer-to-peer download environment in accordance with an embodiment of the disclosure.

FIG. 4 depicts a system architecture 400 for facilitating deployment of update information in which deployed nodes become part of a peer-to-peer or web service download node environment. The system architecture 400 may include one or more bookkeeping nodes 402(1)-402(N), and thus, the architecture for providing the bookkeeping functionality may correspond to a single bookkeeping node embodiment or a web service embodiment. The architecture 400 may further include one or more requesting nodes 404(1)-404(N) requesting one or more code updates, one or more deploying nodes 406(1)-406(N) that are currently deploying one or more code updates, one or more deployed nodes 408(1)-408(N) that have successfully completed deployment of code update(s), and one or more download nodes 410(1)-410(N).

With respect to the architecture 400 depicted in FIG. 4, the download nodes 410(1)-410(N) may preferably include a plurality of nodes implemented according to a web service or a peer-to-peer architecture. Implementation of the download nodes 410(1)-410(N) using a web service or peer-to-peer architecture may avoid the bottleneck and bandwidth issues presented by having a single download node.

The architecture 400 may further include one or more nodes that have previously attempted deployments that have failed, which may include any of the requesting nodes 404(1)-404(N), the deploying node(s) 406(1)-406(N), the deployed node(s) 408(1)-408(N), or the download node(s) 410(1)-410(N). In certain embodiments, each of the nodes forming part of the architecture 400 may be capable of communicating with at least one other node via one or more networks 112 such as those previously described through reference to FIG. 1. Each of the download nodes 410(1)-410(N) may be configured to provide the download functionality. Similarly, each of the one or more bookkeeping nodes 402(1)-402(N) may be configured to provide the bookkeeping functionality.

Each of the bookkeeping node(s) 402(1)-402(N), each of the requesting node(s) 404(1)-404(N), each of the deploying node(s) 406(1)-406(N), and each of the download nodes 410(1)-410(N) may include respectively at least one memory 420, 442, 456, 472 and respectively one or more processing units (or processor(s)) 412, 434, 448, 464. The processors 412, 434, 448, 464 may correspond to any of the types of processors described through reference to FIG. 2 or FIG. 3. Further, each of the at least one memories 420, 442, 456, 472 may correspond to any of the types of at least one memories described through reference to FIG. 2 or FIG. 3.

In addition, each of the nodes 402(1)-402(N), 404(1)-404(N), 406(1)-406(N), 410(1)-410(N) may also include respective additional storage 416, 438, 452, 468 which may correspond to any of the types of additional storage described through reference to FIG. 2 or FIG. 3. The at least one memories 420, 442, 456, 472 and/or the additional storage 416, 438, 452, 468, removable and/or non-removable, are all examples of computer-readable storage media. For example, computer-readable storage media may include volatile and/or non-volatile, removable and/or non-removable media implemented according to any method or technology for storage of information such as computer-readable instructions, data structures, program modules, and/or other data.

Each of the nodes 402(1)-402(N), 404(1)-404(N), 406(1)-406(N), 410(1)-410(N) may also include respective communications connection(s) 418, 440, 454, 470 that may correspond to any of the types of communications connection(s) described through reference to FIG. 2 or FIG. 3, and may also include respective input/output (I/O) device(s) 414, 436, 450, 466, such as a keyboard, a mouse, a pen, a voice input device, a touch input device, a display, speakers, a camera, a microphone, a printer, etc.

Each of the respective at least one memories 420, 442, 456, 472 may have a respective operating system (O/S) 422, 444, 458, 474 loaded therein. Further, respective application(s) 428, 446, 462, 478 may be loaded into the at least one memories 420, 442, 456, 472. Further, each of the bookkeeping nodes 402(1)-402(N) may have a database management system (DBMS) 424 stored in the at least one memory 420 for accessing, retrieving and storing data in one or more datastores (e.g., datastore 432). While the requesting nodes 404(1)-404(N), the deploying nodes 406(1)-406(N), and the download nodes 410(1)-410(N) are not depicted as having database management systems loaded into their respective at least one memories, it will be appreciated by one of ordinary skill in the art that such systems may be provided.

The at least one memory 420 of the bookkeeping node(s) 402(1)-402(N) may be capable of providing bookkeeping functionality using a deployment module 426 stored therein. The deployment module 426 may include computer-executable instructions that when executed by the processor(s) 412 configure the processor(s) 412 to perform one or more operations for facilitating deployment of code update(s) to another node in the environment.

The at least one memory 472 of the download nodes 410(1)-410(N) may store one or more code updates 476 associated with one or more nodes in the architecture 400. The code update(s) 476 may be software updates, firmware updates, or any other code updates. The at least one memory 420 of the bookkeeping node(s) 402(1)-402(N) may further store deployment parameter data 430. The deployment parameter data 430 may include data relating to various deployment parameters including any of the deployment parameters described through reference to FIG. 2 or FIG. 3.

In one or more embodiments, any of the bookkeeping node(s) 402(1)-402(N) may receive a request for a code update of the one or more code updates 476 from a requesting node of the one or more requesting nodes 404(1)-404(N). For simplicity of presentation, it will be assumed that the requesting node from which the request is received is node 404(1).

Upon receiving the request for a code update 476, computer-executable instructions provided as part of the deployment module 426 may be executed to determine whether to allow the requesting node 404(1) to download the code update based on the deployment parameter data 430. Similar determinations, such as those discussed through reference to FIG. 2, may be made by the deployment module 426.

If it is determined that the requesting node 404(1) is authorized to receive the code update 476, the bookkeeping node 402 that received the request from the requesting node 404(1) may direct the requesting node 404(1) to obtain the code update 476 from one or more of the download nodes 410(1)-410(N). In various embodiments, the requesting node 404(1) may receive different portions of the code update 476 from different download nodes of the download nodes 410(1)-410(N). If, on the other hand, it is determined that the requesting node 404(1) is not permitted to deploy the code update at this time based on an analysis of the deployment parameter data 430 (as previously described), the requesting node 404(1) may request deployment again at a later time. As previously described, the bookkeeping node 402 may transmit information to the requesting node 404(1) relating to the current state of the deployment parameter data 430. The transmitted information may further include an estimated wait time before the requesting node 404(1) should again request deployment of the code update.

If the requesting node 404(1) is permitted to deploy, the requesting node 404(1) may download the code update from one or more of the download nodes 410(1)-410(N) and install the code update. Upon completion of deployment, the requesting node 404(1) may correspond to one of the deployed node(s) 408(1)-408(N). Further, upon completion of the deployment, the requesting node 404(1) may correspond to one of the download nodes 410(1)-410(N). That is, upon completion of a deployment, a node may become part of the web service or peer-to-peer download environment such that the node is now available as a node from which other deploying nodes may download the code update.

It should be noted that the deploying node(s) 406(1)-406(N) are shown as having a partial code update 460 stored in the at least one memory 456 because the deployment node(s) 406(1)-406(N) are currently deploying code update(s) (e.g., code update(s) 476), and thus may not yet have completed download and/or installation of the code update(s).

FIG. 4 depicts an architecture 400 in which different types of functionality are implemented according to different architectural configurations. For example, the bookkeeping functionality provided by the bookkeeping nodes 402(1)-402(N) may be implemented according to a single node or web service architecture, whereas the downloading functionality may be implemented according to a web service or peer-to-peer architecture. However, while specific architectures are shown, it should be noted that any of the bookkeeping functionality, the download functionality, or the deploying functionality may be implemented according to any suitable architecture or combinations of architecture.

Figure 5:
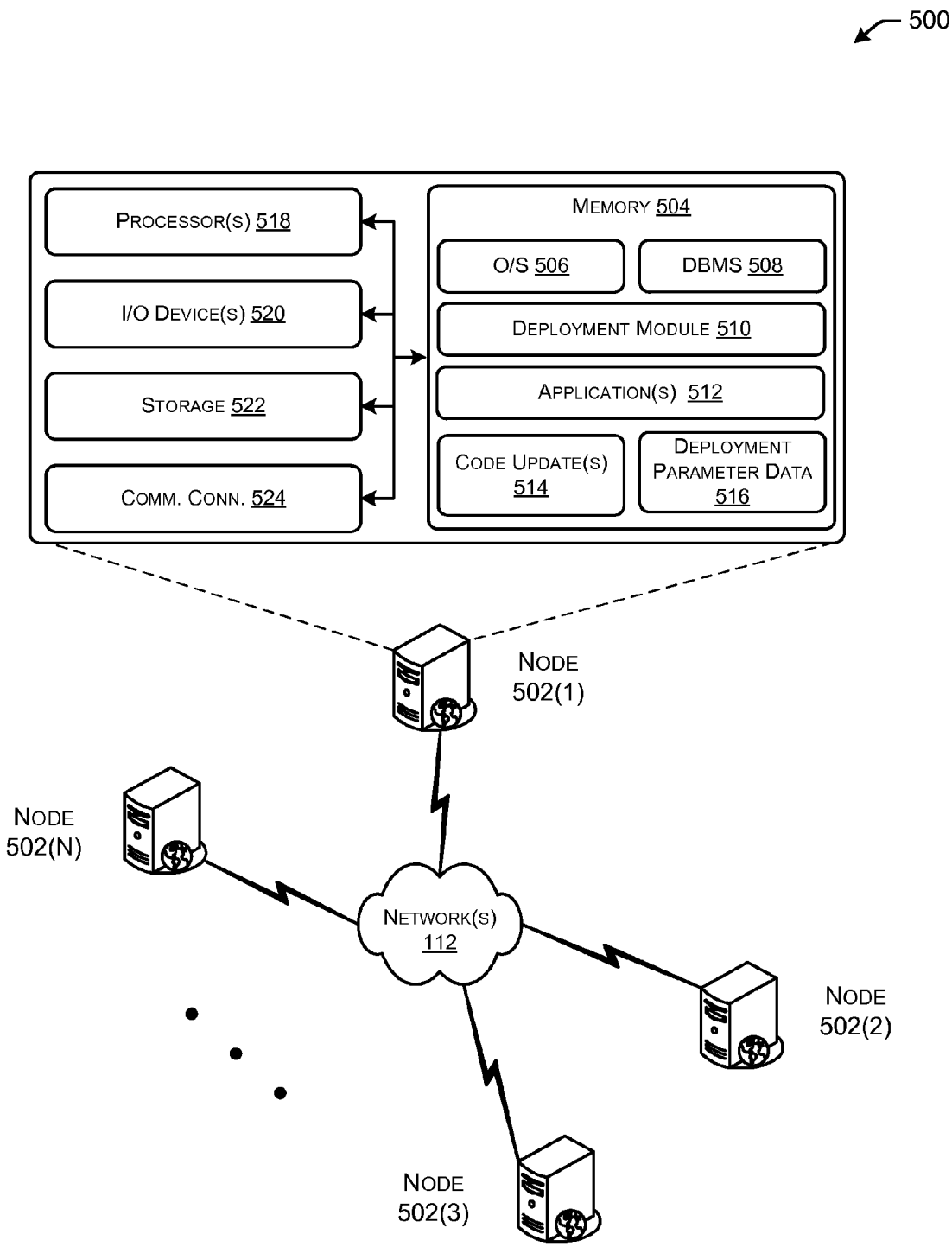
FIG. 5 depicts a system architecture for facilitating peer-to-peer deployment of update information in accordance with an embodiment of the disclosure.

FIG. 5 depicts an illustrative system architecture 500 for facilitating deployment of update information in a peer-to-peer deployment environment. The architecture 500 includes nodes 502(1)-502(N). Each of the nodes 502(1)-502(N) may be capable of providing, at least in part, bookkeeping functionality and/or download functionality to other nodes within the architecture 500.

One or more of the nodes 502(1)-502(N) may include at least one memory 504 and one or more processing units (or processor(s)) 518. The processor(s) 518 may correspond to any of the types of processors previously discussed. Further, the at least one memory 504 may correspond to any of the types of memories previously discussed. In addition, one or more of the nodes 502(1)-502(N) may also include additional storage 522 which may correspond to any of the types of additional storage previously discussed. The at least one memory 504 and/or the additional storage 522, removable and/or non-removable, are all examples of computer-readable storage media. For example, computer-readable storage media may include volatile and/or non-volatile, removable and/or non-removable media implemented according to any method or technology for storage of information such as computer-readable instructions, data structures, program modules, and/or other data.

One or more of the nodes 502(1)-502(N) may also include respective communications connection(s) 524 that may correspond to any of the types of communications connection(s) previously discussed. Further, one or more of the nodes 502(1)-502(N) may also include input/output (I/O) device(s) 520, such as a keyboard, a mouse, a pen, a voice input device, a touch input device, a display, speakers, a camera, a microphone, a printer, etc.

One or more of the nodes 502(1)-502(N) may have a respective operating system (O/S) 506 loaded therein. Further, one or more of the nodes 502(1)-502(N) may have application(s) 512 loaded into the at least one memory 504. Further, one or more of the nodes 502(1)-502(N) may have a database management system (DBMS) 508 stored in the at least one memory 504 for accessing, retrieving, and storing data in one or more datastores (not shown).

The at least one memory 504 of each peer node 502(1)-502(N) (or only those nodes capable of providing bookkeeping functionality) may include a deployment module 510. The deployment module 510 may include computer-executable instructions that when executed by the processor(s) 518 configure the processor(s) 518 to perform one or more operations for facilitating deployment of code update(s) to another node in the environment 500.

The at least one memory 504 of each of the nodes 502(1)-502(N) may store one or more code updates 514 associated with one or more nodes in the architecture 500. The code update(s) 514 may be software updates, firmware updates, or any other code updates. Computer-executable instructions provided as part of the deployment module 510 of each of the nodes 502(1)-502(N) may be executed by the processor(s) 518 to determine a number of actively deploying nodes.

For example, for illustrative purposes, consider node 502(1). The computer-executable instructions provided as part of the deployment module 510 of node 502(1) may include an aggregation algorithm or some other set of instructions capable of facilitating a distributed count of the number of actively deploying nodes within the architecture 500. The distributed count may be made by receiving information from one or more other nodes pertaining to active deployments that those nodes may be aware of. The nodes from which active deployment information is received may further receive similar information from one or more other nodes. In this manner, a distributed count of the number of actively deploying nodes may be made. The determined number of actively deploying nodes may be stored in a counter in the deployment parameter data 516. The deployment parameter data 516 may further store a parameter indicative of a maximum threshold time for deployment.

In a similar manner, the deployment module 510 of node 502(1), for example, may include computer-executable instructions for executing an algorithm to determine a current number or a current percentage of failed deployments. The determined current number or current percentage of failed deployments may be stored as at least part of the deployment parameter data 516. The deployment parameter data 516 may further include data relating to a parameter indicative of a maximum allowable number or maximum allowable percentage of failed deployments.

The deployment module 510 of node 502(1), for example, may include computer-executable instructions that when executed by the processor(s) 518 configure the processor(s) 518 to determine whether the node 502(1) will complete deployment of a code update (perhaps stored on one or more other nodes 502(2)-502(N)) within the maximum allowable deployment time based at least in part on the number of actively deploying nodes. The deployment module 510 may further determine, or alternatively determine, whether deployment of the code update 514 will cause the maximum allowable number or maximum allowable percentage of failed deployments to be exceeded.

If the node 502(1) determines to proceed with the deployment based on one or more determinations made with respect to the deployment parameter data 516, the node 502(1) may proceed to obtain one or more portions of the relevant code update 514 from one or more other nodes 502(2)-502(N). If, on the other hand, the node 502(1) determines that it is not allowed to proceed with the deployment, it may wait a certain period of time before again attempting to deploy. The amount of time that the node 502(1) decides to wait before again determining whether to deploy the code update may be determined, for example, based on the state of the deployment parameter data 516.

Illustrative Processes

Figure 6:
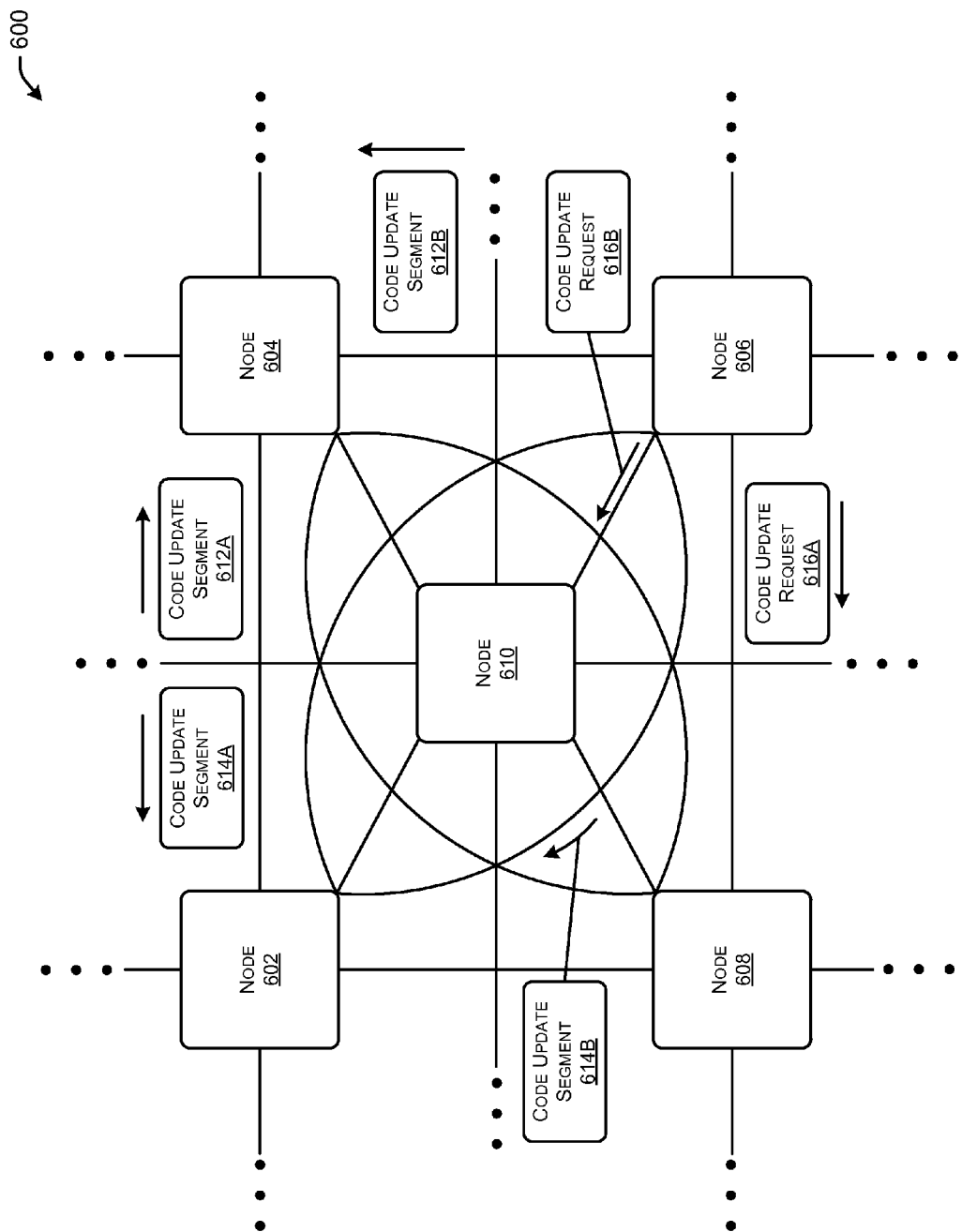
FIG. 6 depicts exemplary data flows in an illustrative peer-to-peer deployment environment in accordance with an embodiment of the disclosure.

FIG. 6 depicts exemplary data flows in an illustrative peer-to-peer deployment environment. The environment 600 may include peer nodes 602, 604, 606, 608, 610. Each of the peer nodes 602-610 may be capable of communicating with each other node via one or more communication links.

In the snapshot depicted in FIG. 6, peer node 602 is receiving code update segment 614A from peer node 604. Peer node 602 is also receiving code update segment 614B from peer node 606. Code update segment 614A and code update segment 614B may correspond to portions of a same code update. In various embodiments, node 602 may receive one or more additional segments of the code update from one or more additional peer nodes.

While peer node 602 is receiving code update segment 614A from peer node 604, peer node 604 may be concurrently receiving code update segment 612A from peer node 602. Peer node 604 may also be receiving code update segment 612B from peer node 606. Code update segment 612A and code update segment 612B may correspond to portions of a same code update. In various embodiments, node 604 may receive one or more additional portions of the code update from one or more additional peer nodes.

In the illustrative data flows depicted in FIG. 6, peer node 606 may transmit a code update request 616B for at least a portion of a code update to peer node 610 and may transmit a code update request 616A for at least another portion of the same code update to peer node 608. In various embodiments, the code update requests 616A, 616B may be transmitted, for example, by peer node 606 upon a determination by peer node 606 that it will be able to complete deployment of the associated code update within the maximum allowable deployment time and/or if peer node 606 further determines that deployment will not exceed a maximum allowable number or maximum allowable percentage of failed deployments. As previously discussed, those determinations may be made based on execution of one or more aggregation algorithms. Alternatively, peer node 606 may transmit the code update requests 616A, 616B upon receiving an indication from one or more other peer nodes that it is authorized to deploy the code update based on similar determinations made by at least one of those one or more other peer nodes.

Figure 7:
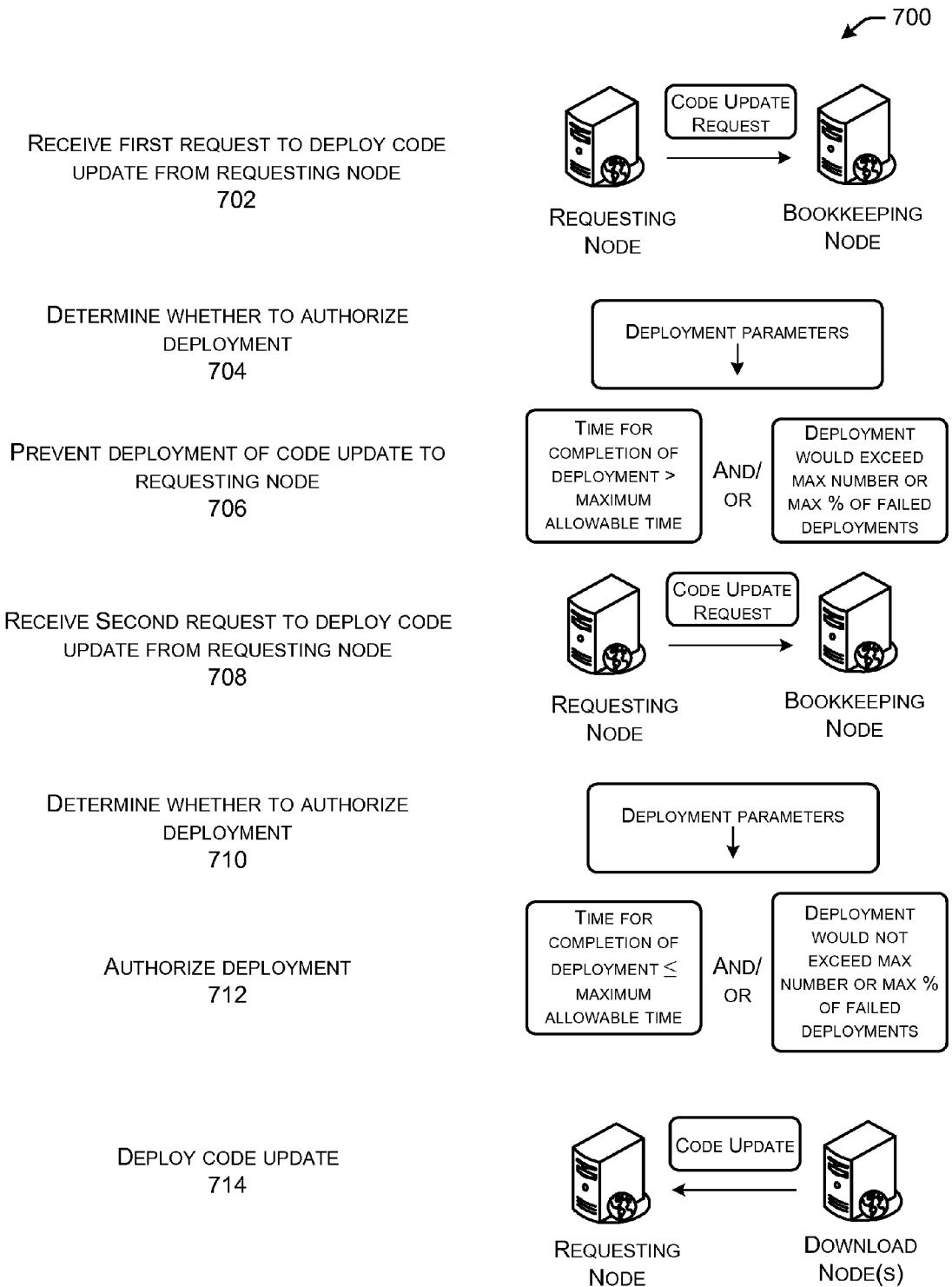
FIG. 7 depicts an illustrative process flow for facilitating deployment of update information by a requesting node in accordance with an embodiment of the disclosure.

FIG. 7 depicts an illustrative process flow for facilitating deployment of a code update by a requesting node. The illustrative process flow of FIG. 7 may be applicable to any of the single bookkeeping and download node embodiments, the web service embodiments, or the peer-to-peer embodiments of the disclosure. At operation 702, a first request to deploy a code update may be received by a bookkeeping node from a requesting node. At operation 704, the bookkeeping node may determine whether to authorize the requesting node to deploy the code update based on an analysis of various deployment parameters such as a maximum allowable deployment time (which may be determined, for example, based on a number of active deployments and/or a number of available download nodes), a current number or a current percentage of failed deployments, a maximum allowable number or a maximum allowable percentage of failed deployments, a current rate of deployment, an adjusted rate of deployment that is adjusted based on previous successful/failed deployments and an associated risk tolerance, and so forth.

In one or more embodiments, as illustratively depicted in FIG. 7, the bookkeeping node may determine a time that the requesting node will take to complete deployment of the code update based at least in part on at least one of: a number of actively deploying nodes, a number of available download nodes, a size of the code update, or any other relevant parameter. Upon determining the time for completion of the deployment by the requesting node, the bookkeeping node may determine whether the completion time exceeds the maximum allowable deployment time. The bookkeeping node may further or alternatively determine whether allowing the requesting node to deploy the code update would potentially result in the maximum number or maximum percentage of failed deployments being exceeded.

At operation 706, the bookkeeping node may prevent the requesting node from deploying the code update based on result(s) of the determination(s) made at operation 704. For example, if it is determined at operation 704 that the time for completion of the deployment exceeds the maximum allowable deployment time and/or it is determined at operation 704 that allowing the requesting node to deploy the code update would potentially cause the maximum number or maximum percentage of failed deployments to be exceeded (e.g., the number of actively deploying nodes would exceed the maximum allowable number of failed deployments), the bookkeeping node may prevent the requesting node from deploying at operation 706.

At operation 708, the bookkeeping node may receive a second request from the requesting node to deploy the code update. Upon receipt of the second request, the bookkeeping node may again determine, at block 710, whether to authorize deployment of the code update based on one or more of the deployment parameters. Any of the determinations mentioned previously may be made at operation 710. For example, at operation 710, the bookkeeping node may determine that the time for completion of the deployment no longer exceeds the maximum allowable deployment time and/or may determine that allowing the requesting node to deploy the code update would not potentially cause the maximum number or maximum percentage of failed deployments to be exceeded (e.g., the number of actively deploying nodes would not exceed the maximum allowable number of failed deployments). Between the time of receipt of the first request and the time of receipt of the second request, the states of various deployment parameters may have changed. For example, the number of actively deploying nodes may have decreased, the number of available download nodes may have increased, the number of successful deployments may have increased, and so forth. Further, as previously described, the bookkeeping node may have increased the rate of deployment based on a certain number of observed successful deployments.

At operation 712, the bookkeeping node may authorize deployment of the code update based on the determination(s) made at operation 710 and may instruct the requesting node to receive the code update from one or more download nodes. At operation 714, the requesting node may receive the code update from one or more download nodes and complete deployment of the code update. While FIG. 7 has been described with respect to certain operations, it should be appreciated that certain operations may not be performed in certain embodiments of the disclosure, and that in certain other embodiments, additional operations may be performed.

Figure 8:
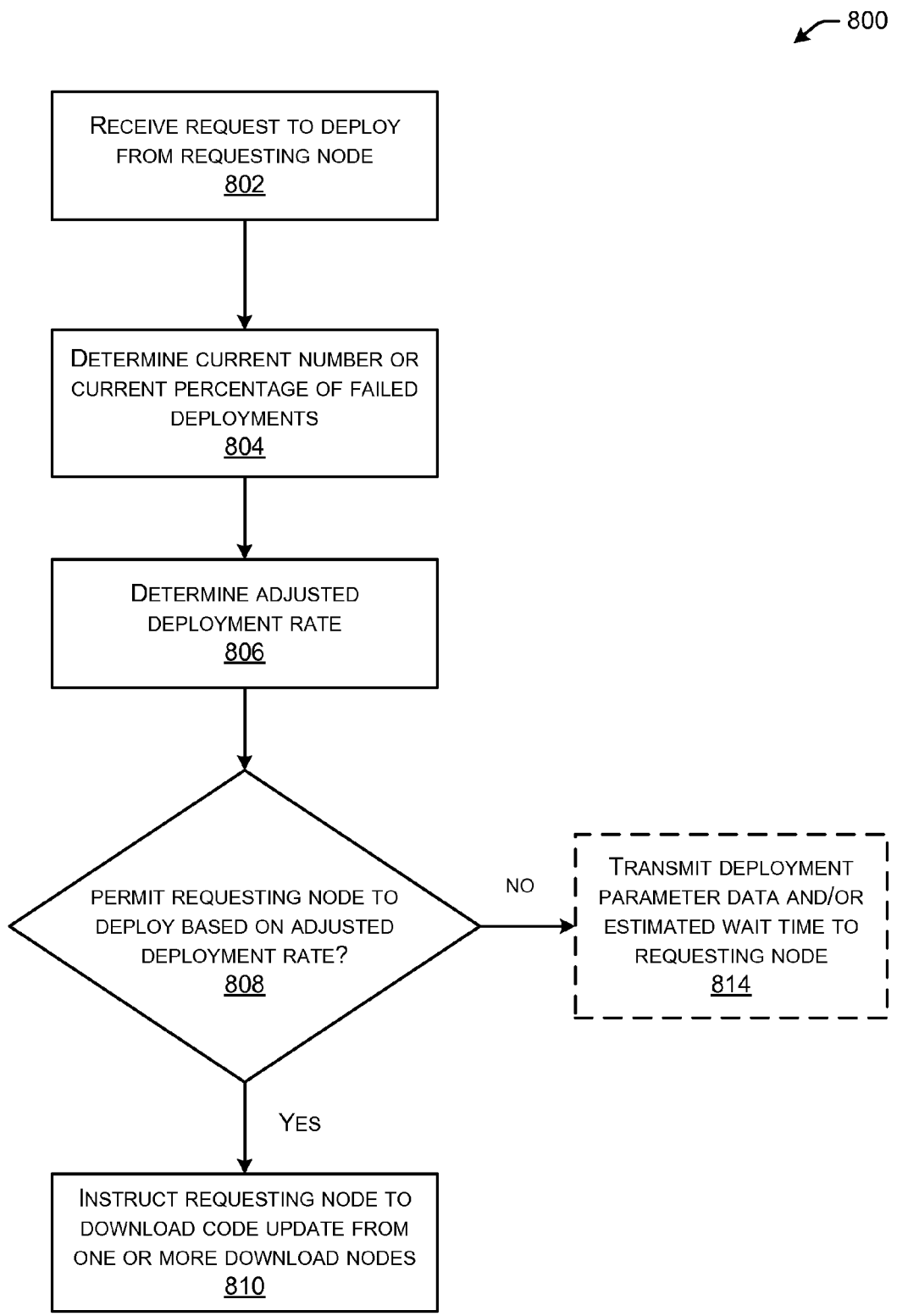
FIG. 8 depicts an illustrative process flow for adjusting a deployment rate in accordance with an embodiment of the disclosure.

FIG. 8 depicts an illustrative process flow 800 for adjusting a deployment rate. At block 802 of the process 800, a bookkeeping node may receive a request to deploy a code update from a requesting node. The bookkeeping node may be organized within any suitable architecture including, but not limited to, a single node architecture, a web service architecture, or a peer-to-peer architecture. The bookkeeping node may also potentially provide download functionality.

At block 804, the bookkeeping node may determine a current number or a current percentage of failed deployments. The current number or current percentage of failed deployments may be determined, for example, by identifying the number of failed deployments among some subset of nodes that have attempted deployments. The subset of nodes may include nodes that have successfully completed deployments, nodes that attempted deployments but have failed to deploy, and/or nodes that are actively deploying.

At block 806, the bookkeeping node may determine an adjusted rate of deployment based at least in part on the current number or current percentage of failed deployments and the maximum allowable number or maximum allowable percentage of failed deployments. For example, the bookkeeping node may determine that among 100 previously attempted deployments, 5 deployments failed, 50 completed successfully, and 45 are in active deployment. The bookkeeping node may determine that this corresponds to a failure rate that is below the maximum allowable failure rate (whether calculated in terms of allowable number of failures or allowable percentage of failures) and may accordingly increase the deployment rate. The bookkeeping node may increase the deployment rate because it has an increased risk tolerance as a result of the low failure rate. Conversely, the bookkeeping node may determine that the observed failure rate is above the maximum allowable failure rate and may accordingly decrease the deployment rate. The bookkeeping node may decrease the deployment rate because it has an decreased risk tolerance as a result of the high failure rate.

At decision block 808, the bookkeeping node may make a determination as to whether to permit the requesting node to begin deployment of the code update based at least in part on the determined adjusted deployment rate. For example, if the bookkeeping node adjusted the deployment rate higher at block 806, it may be more likely to permit the requesting node to deploy. On the other hand, if the bookkeeping node adjusted the deployment rate lower at block 806, it may be less likely to permit the requesting node to deploy.

If the bookkeeping node determines not to permit the requesting node to deploy at block 808, the bookkeeping node may prevent the requesting node from deploying and may optionally, at block 814, transmit deployment parameter data to the requesting node and/or provide the requesting node with an estimated time to wait before again requesting deployment. On the other hand, if the bookkeeping node determines at block 808 to permit the requesting node to deploy the code update based at least in part on the adjusted deployment rate, at block 810, the bookkeeping node may instruct the requesting node to initiate deployment by downloading the code update from one or more download nodes.

While embodiments of the disclosure have been described with respect to certain exemplary architectures (e.g., single bookkeeping and download node architecture, web service architecture, peer-to-peer architecture), it should be appreciated that numerous other architectures for facilitating deployment of code updates in accordance with embodiments of the disclosure are within the scope of this disclosure. Further, while embodiments of the disclosure have been presented with respect to certain specific deployment parameters and/or determinations, it should be appreciated that numerous other deployment parameters may be provided and/or numerous other determinations based on those parameters may be made to facilitate deployment of update information (e.g., code updates).

Although specific embodiments of the disclosure have been described, one of ordinary skill in the art will recognize that numerous other modifications and alternative embodiments are within the scope of the disclosure. For example, any of the functionality and/or process capabilities described with respect to a particular device or component may be performed by any other device or component. Further, although specific examples of detection data, information elements, metrics, relative position information, and so forth have been presented, it should be understood that numerous others are within the scope of this disclosure.

Additional types of computer storage media that may be present in any of the components described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the computing devices of FIG. 1. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. One or more non-transitory computer-readable media storing computer-executable instructions responsive to execution by at least one processor configure the at least one processor to perform operations comprising:
   storing data relating to one or more deployment parameters associated with deployment of update information stored in a group of download nodes, wherein the one or more deployment parameters comprise a parameter indicative of a maximum allowable failure rate;
   receiving a request for the update information from a requesting node;
   determining that the maximum allowable deployment failure rate would not be exceeding if the requesting node attempted and failed to deploy the update information; and
   authorizing the requesting node to deploy the update information responsive to determining that the maximum allowable deployment failure rate would not be exceeded if the requesting node attempted and failed to deploy the update information, wherein authorizing comprises directing the requesting node to obtain the update information from at least one download node of the group of download nodes.

2. The one or more non-transitory computer-readable media of claim 1, wherein the requesting node is a first requesting node, wherein the at least one download node is a first at least one download node, and wherein the one or more deployment parameters further comprise a parameter indicative of a maximum allowable deployment time, the operations further comprising:
   receiving a request for the update information from a second requesting node;
   determining a deployment completion time for the second requesting node to complete deployment of the update information;
   determining that the deployment completion time does not exceed the maximum allowable deployment time; and
   authorizing the second requesting node to deploy the update information responsive to determining that the deployment completion time does not exceed the maximum allowable deployment time, wherein authorizing comprises directing the second requesting node to obtain the update information from a second at least one download node of the group of download nodes.

3. The one or more non-transitory computer-readable media of claim 1, wherein authorizing the requesting node to deploy the update information further comprises updating the data relating to the one or more deployment parameters.

4. The one or more non-transitory computer-readable media of claim 3, wherein updating the data relating to the one or more deployment parameters comprises incrementing a counter indicating a number of nodes that are actively deploying the update information.

5. The one or more non-transitory computer-readable media of claim 4, the operations further comprising:
   determining that the requesting node has successfully deployed the update information; and
   decrementing the counter indicating the number of nodes that are actively deploying the update information.

6. The one or more non-transitory computer-readable media of claim 1, wherein the requesting node is a first requesting node, the operations further comprising:
   receiving a request for the update information from a second requesting node;
   determining that the maximum allowable deployment failure rate would be exceeded if the second requesting node attempted and failed to deploy the update information; and
   preventing the second requesting node from obtaining the update information responsive to determining that the maximum allowable deployment failure rate would be exceeded if the second requesting node attempted and failed to deploy the update information.

7. A method comprising:
   receiving, by a bookkeeping node from a requesting node, a request to deploy update information;
   determining, by the bookkeeping node, whether to authorize the requesting node to deploy the update information based at least in part on one or more deployment parameters, wherein the one or more deployment parameters comprise a maximum allowable deployment failure rate, and wherein determining whether to authorize the requesting node to deploy the update information comprises determining, by the bookkeeping node, that the maximum allowable deployment failure rate would not be exceeded if the requesting node attempted and failed to deploy the update information and authorizing, by the bookkeeping node, the requesting node to deploy the update information, wherein authorizing comprises directing, by the bookkeeping node, the requesting node to obtain the update information from at least one download node of a group of one or more download nodes storing the update information.

8. The method of claim 7, wherein the requesting node is a first requesting node, the request is a first request, and the at least one download node is a first at least one download node, and wherein the one or more deployment parameters further comprise a maximum allowable deployment time, the method further comprising:

receiving, by the bookkeeping node from a second requesting node, a second request to deploy the update information;

determining, by the bookkeeping node, that a deployment time for the second requesting node to deploy the update information does not exceed the maximum allowable deployment time; and authorizing, by the bookkeeping node, the second requesting node to deploy the update information, wherein authorizing comprises directing, by the bookkeeping node, the second requesting node to obtain the update information from a second at least one download node of the group of one or more download nodes storing the update information.

9. The method of claim 8, wherein the one or more deployment parameters further comprise at least one of: a number of active deployments or a number of download nodes in the group of download nodes from which the update information is obtainable, and wherein the deployment time comprises a time for the second requesting node to complete deployment of the update information, and wherein the deployment time is based at least in part on at least one of: the number of active deployments or the number of download nodes.

10. The method of claim 7, wherein the requesting node is a first requesting node and the request is a first request, the method further comprising:

receiving, by the bookkeeping node from a second requesting node, a second request to deploy the update information; and determining, by the bookkeeping node, that the maximum allowable deployment failure rate would be exceeded if the second requesting node attempted and failed to deploy the update information; and preventing, by the bookkeeping node, the second requesting node from deploying the update information.

11. The method of claim 10, wherein preventing the second requesting node from deploying the update information comprises transmitting, by the bookkeeping node to the second requesting node, data relating to the one or more deployment parameters.

12. The method of claim 10, wherein preventing the second requesting node from deploying the update information comprises transmitting, by the bookkeeping node to the second requesting node, an estimated wait time, wherein the wait time comprises a minimum time between receipt of the second request and receipt of a third request from the second requesting node to deploy the update information.

13. The method of claim 7, wherein the one or more deployment parameters further comprise at least one of: a current deployment rate or a current deployment failure rate.

14. The method of claim 13, further comprising: adjusting, by the bookkeeping node, the maximum allowable deployment rate based at least in part on the current deployment rate or the current deployment failure rate to generate an adjusted maximum allowable deployment failure rate.

15. The method of claim 14, wherein the requesting node is a first requesting node, the request is a first request, and the at least one download node is a first at least one download node, the method further comprising:

receiving, by the bookkeeping node from a second requesting node, a second request to deploy the update information;

determining that the adjusted maximum allowable deployment failure rate would not be exceeded if the second requesting node attempted and failed to deploy the update information; and authorizing, by the bookkeeping node, the second requesting node to deploy the update information, wherein the authorizing comprises directing, by the bookkeeping node, the second requesting node to obtain the update information from a second at least one download node of the group of download nodes storing the update information.

16. The method of claim 13, wherein the requesting node is a first requesting node, the request is a first request, the at least one download node is a first at least one download node, and wherein the one or more deployment parameters further comprise a maximum allowable deployment failure rate, the method further comprising: receiving, by the bookkeeping node from a second requesting node, a second request to deploy the update information; determining, by the bookkeeping node, that a deployment time for the second requesting node to deploy the update information exceeds the maximum allowable deployment time; and preventing the second requesting node from obtaining the update information from the set of download nodes.

17. The method of claim 7, wherein the group of one or more download nodes includes the bookkeeping node, and wherein directing the requesting node to receive the update information comprises:

transmitting at least a portion of the update information from the bookkeeping node to the requesting node.

18. The method of claim 17, wherein the group of one or more download nodes includes only the bookkeeping node.

19. The method of claim 7, wherein the bookkeeping node is one of a plurality of bookkeeping nodes storing data relating to the one or more deployment parameters.

20. The method of claim 19, wherein the plurality of bookkeeping nodes and the group of one or more download nodes include at least one common node.

21. The method of claim 7, wherein the one or more deployment parameters further comprise a download parameter indicative of a number of nodes in the group of one or more download nodes or the number of nodes in the group of download nodes in relation to a total number of nodes, and wherein the requesting node is a first requesting node, and the request is a first request, the method further comprising:

receiving, by the bookkeeping node, a second request for the update information from a second requesting node;

determining, by the bookkeeping node, that the download parameter exceeds a threshold value; and authorizing, by the bookkeeping node, the second requesting node to deploy the update information.

22. The method of claim 7, wherein the one or more deployment parameters further comprise a parameter indicative of a number of active deployments, a parameter indicative of a current number of failed deployments, and a maximum allowable number of failed deployments, and wherein determining that the maximum allowable deployment failure rate would not be exceeded if the requesting node attempted and failed to deploy the update information comprises:
  determining that the number of active deployments incremented by one would not exceed a difference between the maximum allowable number of failed deployments and the current number of failed deployments.

23. A system comprising:
  a plurality of nodes comprising:
  at least one bookkeeping node storing data relating to one or more deployment parameters, wherein the one or more deployment parameters comprise a maximum allowable deployment failure rate,
  one or more download nodes storing the update information, and
  a requesting node,
  wherein the at least one bookkeeping node comprises:
    at least one processor; and
    at least one memory storing computer-executable instructions that upon execution by the at least one processor configure the at least one processor to:
      receive a request from the requesting node to deploy the update information,
      determine whether the maximum allowable deployment failure rate would be exceeded if the requesting node attempted and failed to deploy the update information, and
      authorize the requesting node to deploy the update information if it is determined that maximum allowable deployment failure rate would not be exceeded, wherein authorizing comprises directing, by the bookkeeping node, the requesting node to obtain the update information from at least one download node of the one or more download nodes storing the update information, or prevent the requesting node from deploying the update information if it is determined that the maximum allowable deployment failure rate would be exceeded.

24. The system of claim 23, wherein the requesting node is a first requesting node, the request is a first request, the at least one download node is a first at least one download node, and the one or more deployment parameters further comprise a maximum allowable deployment time, and wherein the at least one processor is further configured to execute the computer-executable instructions to:
  receive a second request from a second requesting node to deploy the update information,
  determine whether a deployment time associated with deployment of the update information by the second requesting node exceeds the maximum allowable deployment time, and
  authorize the second requesting node to deploy the update information if it is determined that the deployment time does not exceed the maximum allowable deployment time, wherein authorizing comprises directing, by the bookkeeping node, the second requesting node to obtain the update information from a second at least one download node of the one or more download nodes storing the update information, or prevent the second requesting node from deploying the update information if it is determined that the deployment time exceeds the maximum allowable deployment time.

25. The system of claim 24, wherein the plurality of nodes further comprises at least one deploying node currently deploying the update information, wherein the one or more deployment parameters comprise a parameter indicating a number of the at least one deploying node, and wherein the at least one processor is further configured to execute the computer-executable instructions to determine the deployment time based at least in part on the number of the at least one deploying node.

26. The system of claim 23, wherein:
  the update information comprises a plurality of portions of update information,
  the at least one bookkeeping node comprises a plurality of bookkeeping nodes, each of the plurality of bookkeeping nodes storing a respective at least a portion of the data relating to the one or more deployment parameters,
  the at least one download node comprises a plurality of download nodes, each of the plurality of download nodes storing a respective one or more of the portions of the plurality of portions of the update information, and
  the requesting node, each of the at least one deploying node, and each of the plurality of download nodes is a same node as a respective one of the plurality of bookkeeping nodes.

27. A system comprising:
  a plurality of nodes, wherein each node stores a respective portion of update information and respective data relating to one or more deployment parameters associated with deployment of at least the respective portion of the update information, wherein the one or more deployment parameters comprise a maximum allowable deployment failure rate, and wherein each node comprises:
    at least one processor, and
    at least one memory comprising computer-executable instructions,
    wherein execution of the computer-executable instructions stored in the at least one memory of a first node of the plurality of nodes by the at least one processor of the first node configures the at least one processor of the first node to perform operations comprising:
      determining, based at least in part on the one or more deployment parameters, that deployment of the update information by the first node is authorized by determining that the maximum allowable deployment failure rate would not be exceeded if the first node attempted and failed to deploy the update information, and
      obtaining a respective portion of the update information from a second node of the plurality of nodes.

28. The system of claim 27, the operations further comprising: determining a number of nodes currently deploying one or more portions of the update information by executing an aggregation algorithm, and determining the maximum allowable deployment failure rate based at least in part on the number of nodes currently deploying the one or more portions of the update information.

29. The system of claim 27, wherein the update information comprises at least one of: a software update or a firmware update.

* * * * *